March 25, 1958 M. H. PETERSON ET AL 2,827,842
AGRICULTURAL MACHINE
Filed May 5, 1954 6 Sheets-Sheet 1
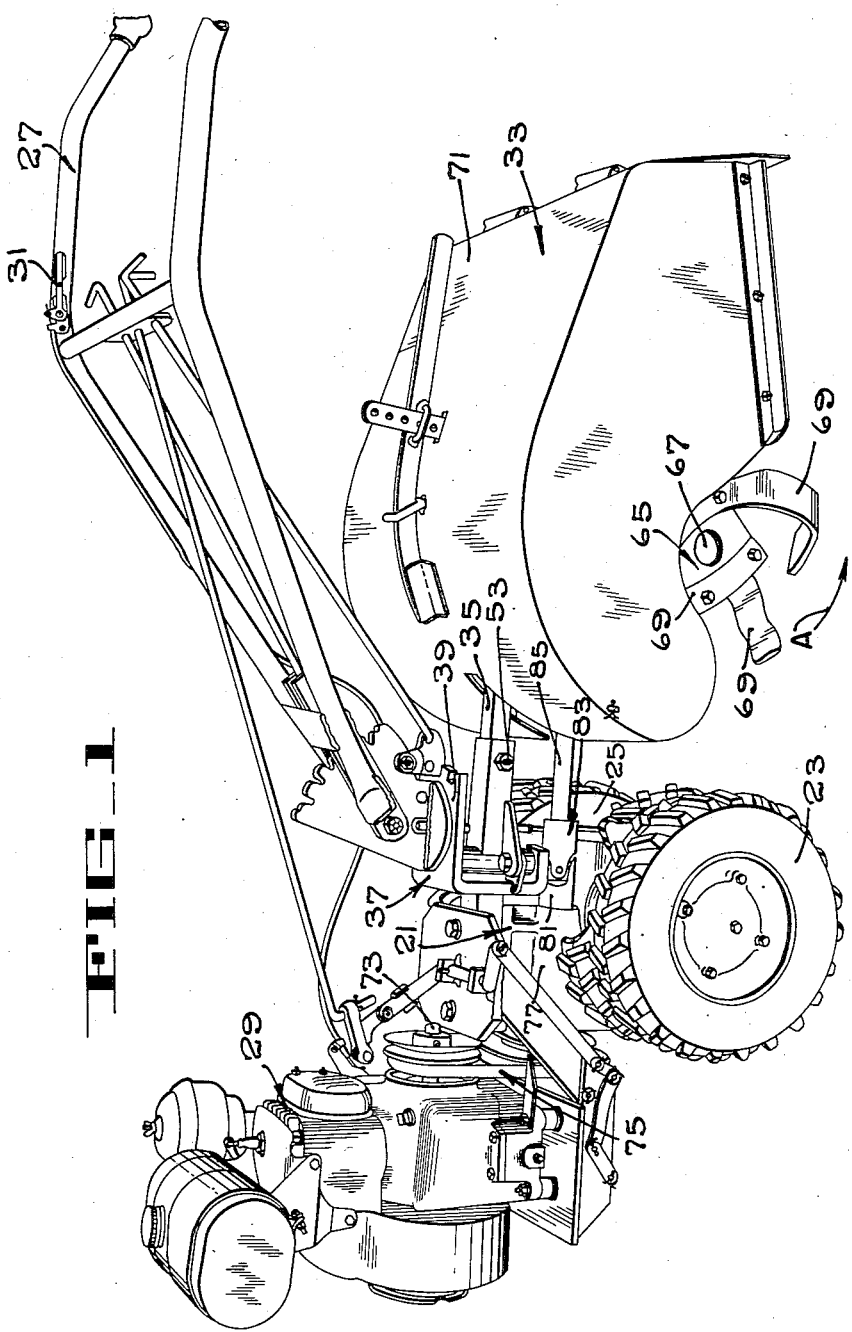
FIG_1
INVENTORS
MERLE H. PETERSON
WILLIAM J. ADAMS, JR.
KNUTE O. ENGNELL
BY Hans G. Hoffmeister.
ATTORNEY March 25, 1958   M. H. PETERSON ET AL   2,827,842
AGRICULTURAL MACHINE
Filed May 5, 1954   6 Sheets-Sheet 2
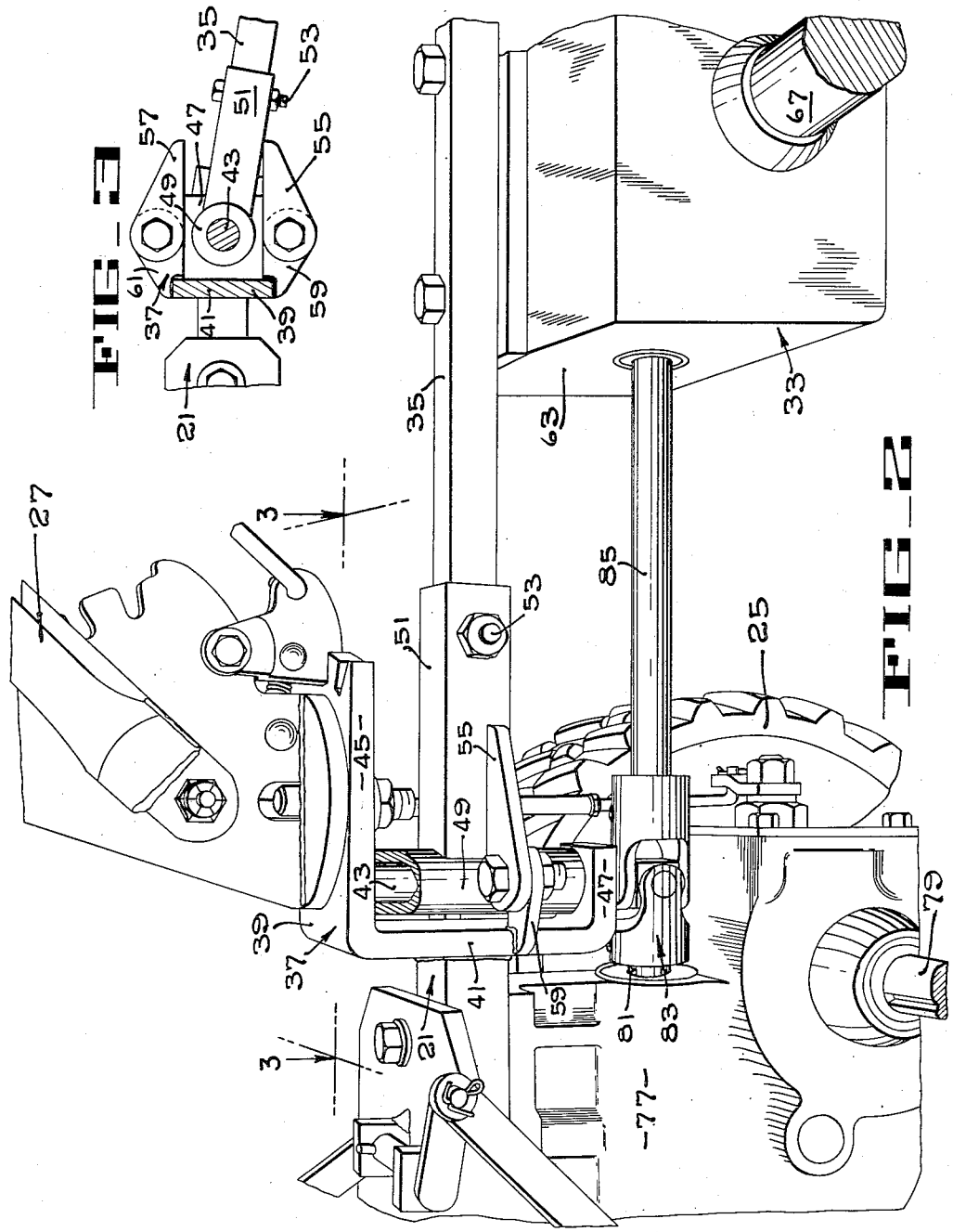
INVENTORS
MERLE H. PETERSON
WILLIAM J. ADAMS, JR.
KNUTE O. ENGNELL
BY Hans G. Hoffmeister
ATTORNEY

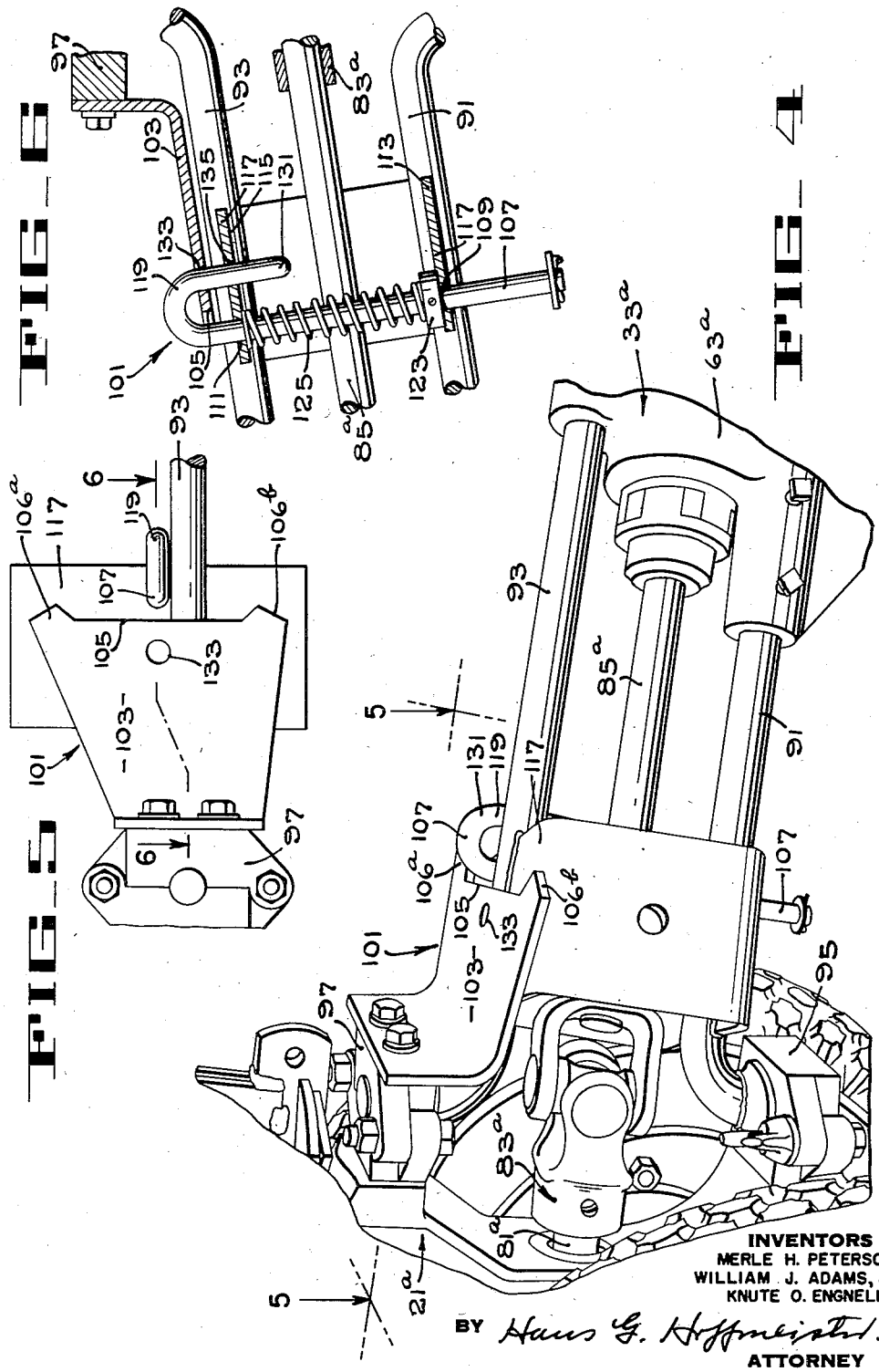

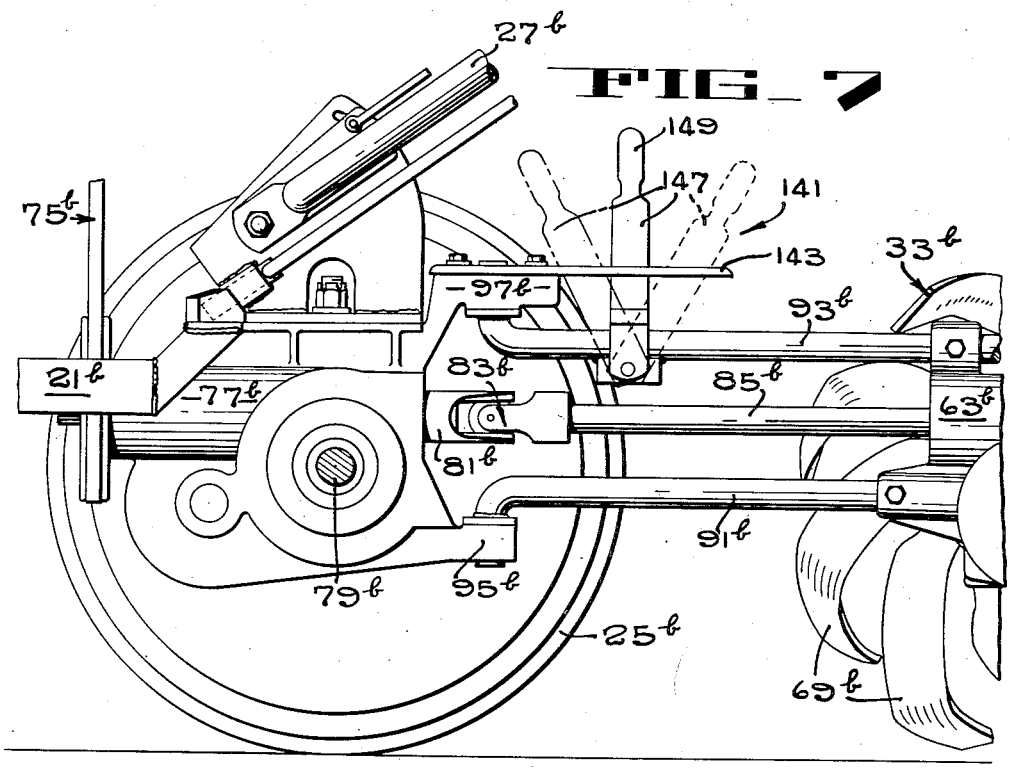
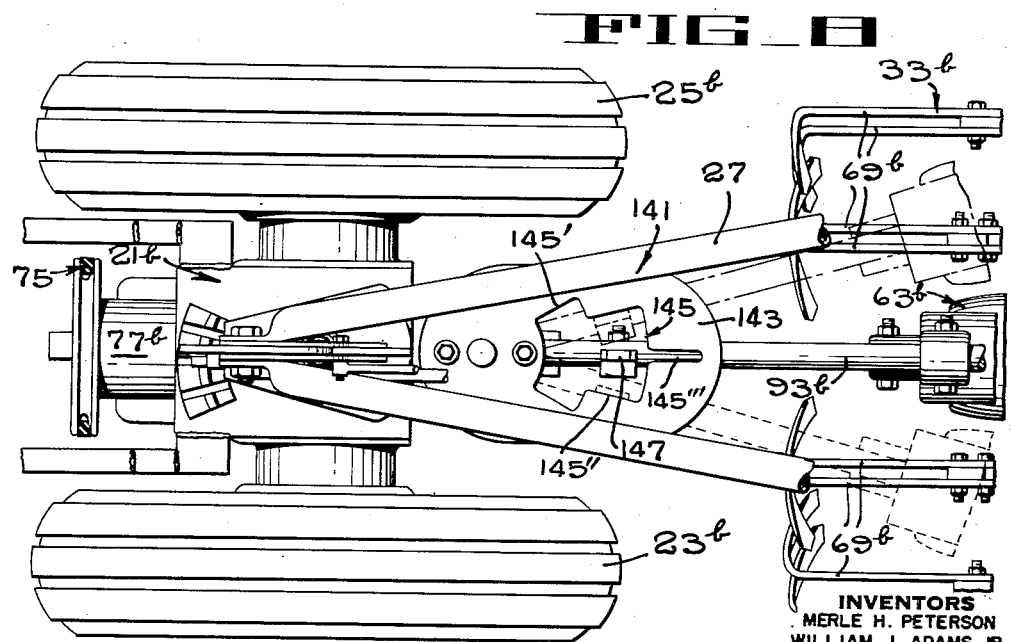

March 25, 1958    M. H. PETERSON ET AL    2,827,842
AGRICULTURAL MACHINE
Filed May 5, 1954                        6 Sheets-Sheet 5
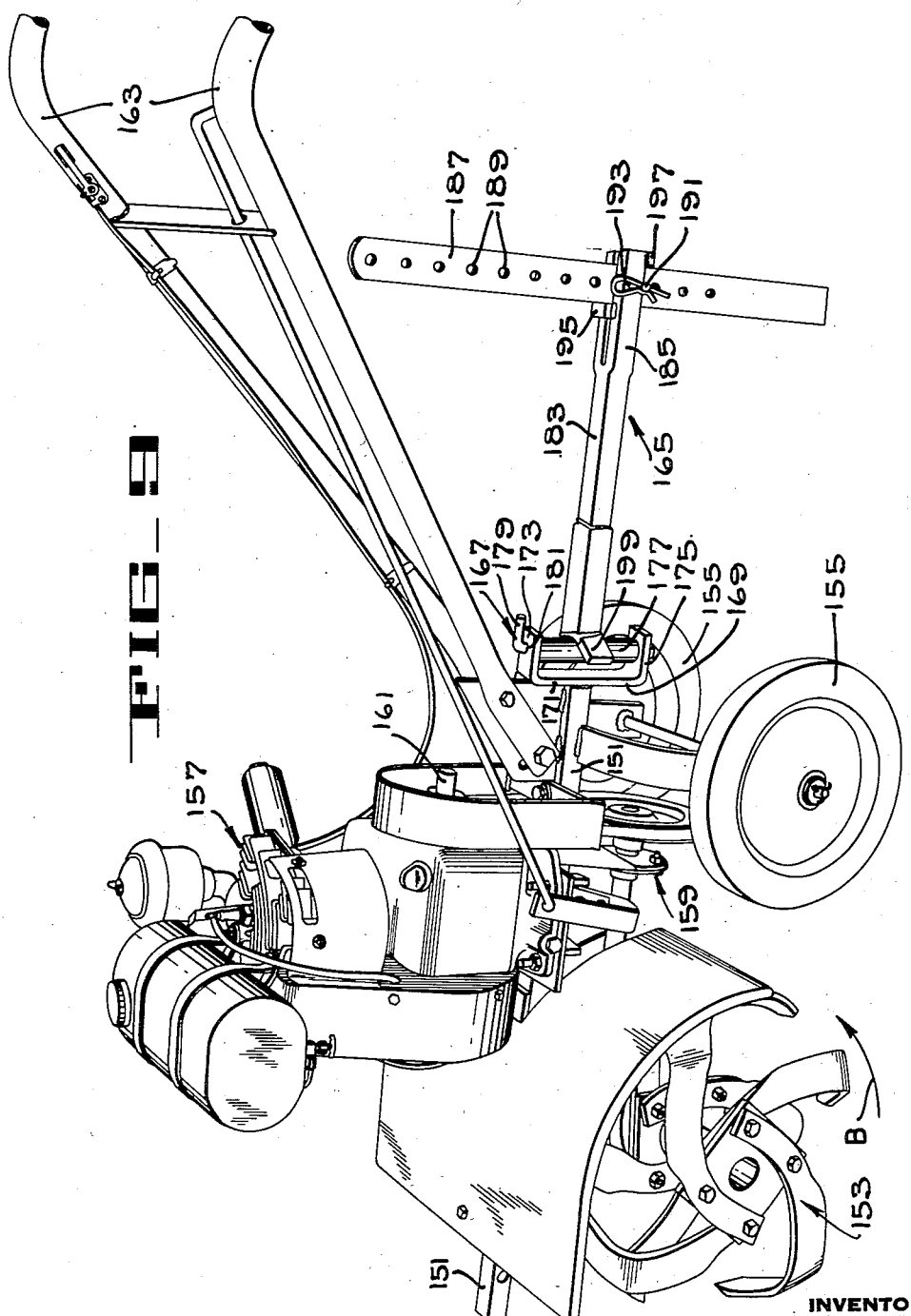
INVENTORS
MERLE H. PETERSON
WILLIAM J. ADAMS, JR
KNUTE O. ENGNELL
BY Hans G. Hoffmeister
ATTORNEY March 25, 1958 M. H. PETERSON ET AL 2,827,842
AGRICULTURAL MACHINE
Filed May 5, 1954 6 Sheets-Sheet 6
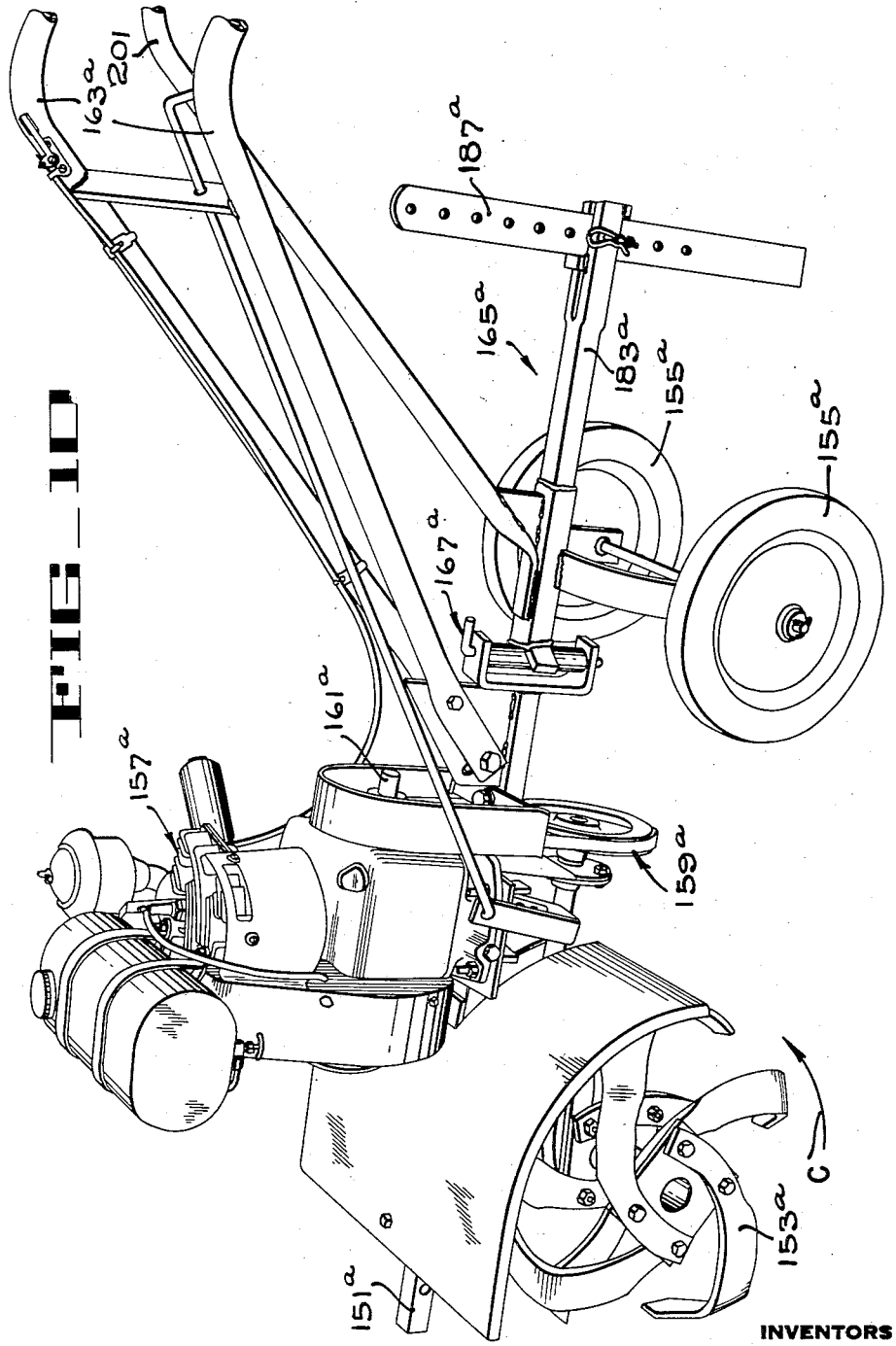
INVENTORS
MERLE H. PETERSON
WILLIAM J. ADAMS, JR
KNUTE O. ENGNELL
BY Hans G. Hoffmeister
ATTORNEY United States Patent Office 2,827,842
Patented Mar. 25, 1958

2,827,842
AGRICULTURAL MACHINE

Merle H. Peterson, Grafton, Wis., William J. Adams, Jr., Campbell, Calif., and Knute O. Engnell, Port Washington, Wis., assignors to Food Machinery and Chemical Corporation, San Jose, Calif., a corporation of Delaware Application May 5, 1954, Serial No. 427,710

3 Claims. (Cl. 97—40)

This invention relates to agricultural machines and more particularly to self-powered soil tillers.

One object of the present invention is to provide a self-powered, rotary soil tiller having a high degree of maneuverability.

Another object is to provide a self-powered, rotary soil tiller of the type controlled by an operator walking behind the tiller which may be easily steered.

These and other objects and advantages of the present invention will become apparent from the following description and the accompanying drawings in which:

Fig. 1 is a perspective of a rotary soil tiller embodying the present invention, certain parts being broken away.

Fig. 2 is an enlarged fragmentary perspective of the tiller shown in Fig. 1.

Fig. 3 is a horizontal section of a portion of Fig. 2 taken along lines 3—3 thereof.

Fig. 4 is a fragmentary perspective similar to Fig. 2 of a modification of the present invention.

Fig. 5 is a substantially horizontal section of a portion of Fig. 4 taken along lines 5—5 thereof.

Fig. 6 is a vertical section taken along lines 6—6 of Fig. 5.

Fig. 7 is a fragmentary elevation of another modification of the present invention, different operational positions of a certain part being shown in dotted lines.

Fig. 8 is a fragmentary plan view of the device shown in Fig. 7, different operational positions of certain parts being shown in dotted lines.

Fig. 9 is a perspective of another modification of the present invention, certain portions being broken away.

Fig. 10 is a perspective of another modification of the present invention, certain portions being broken away.

The present invention is shown embodied in a rotary soil tiller of the type controlled by an operator who walks behind the tiller. The tiller comprises a frame 21 (Figs. 1, 2 and 3) supported above the ground by two drive wheels 23 and 25 (Fig. 1), and having a pair of rearwardly extending handle bars 27 adapted for vertical and horizontal pivotal adjustment. An internal combustion engine 29 is mounted on the front of the frame 21 and is controlled by a throttle lever 31 pivoted to one of the handle bars 27. A rotor unit 33 having a draw bar 35 of square cross section (Fig. 2) is pivotally connected to the frame 21 for lateral swinging movement relative thereto by means of a hinge 37.

The hinge 37 comprises an L-shaped member 39 whose short leg 41 is welded in an upstanding position to the rear of the frame 21 and which has a pivot pin 43 fastened vertically between the long leg 45 of the member 39 and the inturned end portion 47 of the short leg 41. A cylindrical sleeve 49 welded across one end of a short tube 51 of square cross section is journaled on the pin 43. The rotor unit 33 is fastened to the hinge 37 by mating the draw bar 35 with the tube 51 and then passing a machine bolt 53 through aligned holes (not shown) in the tube 51 and a hole (also not shown) in the draw bar 35. The amount of lateral swinging movement of the rotor unit 33 is limited by a pair of stop members 55 and 57 (Fig. 3) adjustably bolted to a pair of ears 59 and 61 welded on opposite sides of the short leg 41 of the L-shaped member 39. The stop members 55 and 57 are arranged so that they are in the pivotal path of the tube 51 and by adjusting their position the lateral pivoting of the rotor unit 33 may be regulated. It should be noted that the rotor unit 33 may be locked in any desired position of lateral pivotal adjustment by placing the rotor unit in the desired position and securing both of the stop members 55 and 57 in positions in which they bear against the tube 51.

The drawbar 35 (Fig. 2) of the rotor unit 33 is bolted to a gear housing 63 which journals a rotor 65 comprising a live transverse axle 67 having a plurality of soil cultivating tines 69 (Fig. 1) arranged circumferentially therearound. A hood 71 is adjustably supported from the drawbar 35 and it surrounds the upper and rear portions of the rotor 65 to protect the operator and the tiller from flying dirt, stones, and other debris.

Power to drive the tiller forward and to operate the rotor 65 is transmitted from the engine shaft 73 (Fig. 1) through a belt and pulley device 75 to a transmission 77 secured beneath the frame 21. The transmission 77 drives two horizontally disposed, transverse axles 79 (Fig. 2), only one of which is shown, upon which the drive wheels 23 and 25 are rigidly mounted. The transmission 77 also drives a rearwardly extending shaft 81 (Fig. 2) that is connected by a universal joint 83 to a shaft 85 journaled in the gear housing 63 and operatively connected to the live axle 67. The universal joint 83 is so arranged that its center point is aligned with the center line of the hinge pivot pin 43. With this alignment of the hinge 37 and the universal joint 83 the rotor unit 33 is free to pivot laterally without the drive shaft 85 impeding such motion, since the shaft 85 and the rotor unit 33 have the same pivotal axis.

In operation, the engine 29 drives the tiller forward over the ground to be tilled at a low speed and rotates the rotor 65 at a suitable speed in the direction of the arrow A (Fig. 1), thus causing the tines 69 to progressively enter and break up the soil. The tiller is steered with the aid of the handle bars 27 by the operator who walks directly behind the tiller or slightly to one side, in which case the handle bars 27 may be adjusted at a slight angle with the centerline of the tiller so that they may be more easily grasped. The hinged connection between the tiller frame 21 and the rotor unit 33 makes it possible to readily steer the tiller in a curved path of small radius, to compensate for side slippage when operating the tiller across a slope, and to abruptly change the course of the tiller, thereby enabling cultivation of the soil very close to plants. The arrangement of the universal joint 83 in alignment with the center line of the hinge 37 provides for the transmission of power to the rotor 65 with a simple mechanical construction and without hindering the lateral movement of the rotor unit 33. However, if for any reason, it is desired to restrict or prevent the lateral pivotal movement of the rotor unit 33, this may be accomplished by appropriately adjusting the stop members 55 and 57 on either side of the tube 51 as explained hereinbefore.

The modified rotary soil tiller disclosed in Figs. 4, 5 and 6 is similar to that of Figs. 1, 2 and 3 and, consequently, a detailed showing and description of only the modified portion of the present tiller will suffice to give a complete understanding of its structure and operation. In the following description the parts of the modification of Figs. 4, 5 and 6 which have corresponding parts in the embodiment shown in Figs. 1, 2 and 3 will be indicated by the same numeral as their aforementioned corresponding parts but will be separately identified by the suffix letter a. In Figs. 4, 5 and 6, the rotor unit 33a (Fig. 4) is pivotally connected to the tiller frame 21a for lateral swinging movement by means of a pair of drawbars 91 and 93 secured to the rear of the rotor gear housing 63a in a vertically spaced relationship. The forward ends of the drawbars 91 and 93 are bent downwardly and upwardly respectively in order that they may be journaled in vertically aligned bearings 95 and 97, secured to the tiller frame 21a. The angularity of these bent ends is such that the drawbars 91 and 93 are inclined downwardly from their point of attachment to the frame 21a. This downward inclination of the drawbars 91 and 93 permits the tiller engine to be held substantially level during the tilling operation, whereas in the embodiment shown in Figs. 1, 2 and 3 it is necessary to tilt the frame 21 and consequently the engine 29 backward, in order to position the rotor unit 33 for maximum tilling efficiency.

The universal joint 33a (Fig. 4) is arranged with its center point on the centerline of the aligned bearings 95 and 97 so that the drive shaft 85a may pivot about the same axis as the rotor unit 33a. The amount of lateral swinging movement permitted the rotor unit 33a is regulated by a turn limiting device 101 (Figs. 4, 5 and 6) which comprises a rearwardly extending plate 103 bolted to the upper bearing 97 and provided at its rear edge with an elongated transverse notch 105 thus forming lateral prongs 106a and 106b. A pin 107 adapted to cooperate with the plate 103 is slidably mounted in a pair of aligned holes 109, 111 (Fig. 6) provided in the opposite legs 113 and 115 of a U-shaped brace plate 117 welded to the drawbars 91 and 93 and the free upper end of the pin 107 is rebent to form a hook 119. The pin 107 is maintained in operative relation with the notch 105 by a collar 123 that is securely mounted on the pin 107 adjacent its lower end and which rests on the upper surface of the lower leg 113 of the U-shaped plate 117. With the pin 107 turned so that the hook 119 faces rearwardly (Figs. 4 and 5) the rotor unit 33a is free to pivot laterally within the limits provided by the prongs 106a and 106b (Fig. 5) which are arranged in the orbital path of the pin 107. If the pin 107 is raised and turned so that the hook 119 faces forward, when the rotor unit 33a swings into a position in longitudinal alignment with the frame 21a, a spring 125 interposed between the collar 123 and the leg 115 will pull the rebent end 131 (Fig. 6) of the hook 119 through a hole 133 in the plate 103 and a hole 135 in the upper leg 115 of the brace plate 117, thereby locking the rotor unit 33a against lateral pivotal movement. This rotor unit locking position of the turn limiting device 101 is extremely useful when it is desired to turn the tiller around in a small space, as at the end of a row of crops being cultivated. With the rotor unit 33a locked against lateral pivotal movement the tiller may be conveniently tilted forwardly to remove the rotor from contact with the ground without the hinged rotor unit 33a tending to jackknife. Then the tiller may be easily swung around in place.

The modified rotary soil tiller disclosed in Figs. 7 and 8 is similar to that of Figs. 1 to 6, inclusive, and consequently, a detailed showing and description of only the modified portion of the present tiller will suffice to give a complete understanding of its structure and operation. In the following description the parts of the modification of Figs. 7 and 8 which have corresponding parts in the embodiments shown in Figs. 1 to 6, inclusive, will be indicated by the same numeral as their aforementioned corresponding parts, but will be separately identified by the suffix letter b. The modification shown in Figs. 7 and 8 is very similar to the modification shown in Figs. 4, 5 and 6, except that the drawbars 91b and 93b (Fig. 7) are horizontal rather than inclined and the rotor unit 33b is provided with a modified rotor unit turn limiting device 141. As in the modification of Figs. 4, 5 and 6, the modification of Figs. 7 and 8 has its drawbars 91b and 93b (Fig. 7) journaled in aligned bearings 95b and 97b and has its universal joint 83b arranged with its center point on the center line of the aligned bearings 95b and 97b so that the rotor unit 33b is free to pivot laterally of the frame 21b.

The turn limiting device 141 (Figs. 7 and 8) comprises a flat plate 143 that is secured to the upper face of the bearing 97b and extends rearwardly therefrom. The plate 143 is provided with an opening 145 which has its laterally opposite margins stepped so as to form a series of rearwardly diminishing sections 145', 145" and 145'''. A lever 147 having a handle 149 is pivotally mounted on the drawbar 93b directly beneath the section 145" of the opening 145 and extends upwardly through said opening. With the aid of friction washers (not shown) the lever 147 is fastened to the drawbar 93b in such a manner that although it may be manually pivoted fore and aft it will remain in any pivotally adjusted position in which it may be placed.

The described turn limiting device 141 greatly aids in maneuvering the tiller by providing a readily adjusted means for curtailing lateral pivotal movement of the rotor unit 33b. For instance, when row crops are being cultivated it is desirable that the tiller have a high degree of maneuverability so that the soil close to the plants may be tilled. In this case the lever 147 may be swung forward into the widest section 145' of the opening 145, thus allowing a large amount of freedom in the lateral pivoting of the rotor unit 33b. However, when the tiller is being operated across a hill or slope, it may be desirable to restrict somewhat the lateral pivotal limits of the rotor unit 33b, and in this case the lever 147 should be placed upright, as shown in full lines in Figs. 7 and 8, so that it is arranged in the intermediate section 145" of the opening 145. At times it may be highly desirable to completely eliminate any lateral swinging of the rotor unit 33b, such as when the tiller must be turned around in a small space, and in this event the lever 147 may be swung rearwardly into the narrowest section 145''' of the opening 145. In this position of the lever 147, the rotor unit 33b is locked in alignment with the longitudinal centerline of the tiller.

The modified embodiment of the invention shown in Fig. 9 is a rotary soil tiller of the type which is moved forward solely by the rotation of the tiller rotor. Such tillers are well known in the art and comprise a frame 151 (Fig. 9) supported above the ground by a tined rotor 153 journaled at its mid-point to the front of the frame 151 and by a pair of wheels 155 attached to the rear of said frame. An internal combustion engine 157 is mounted on the frame 151 in any convenient manner and transmission means 159 are provided for transmitting power from the engine shaft 161 to the rotor 153 for rotating the rotor in the direction of the arrow B (Fig. 9). A pair of handle bars 163 are fastened to the frame 151 above the wheels 155 and extend upwardly and rearwardly to a point where they are within easy reach of the operator who walks behind the tiller.

In the modification of Fig. 9, a drag unit 165 is pivotally connected by means of a hinge 167 to the rear of the frame 151 for lateral swinging movement relative thereto. The hinge 167 comprises a stationary U-shaped bracket 169 whose bight 171 is welded to the rear end of the frame 151 with its legs 173 and 175 extending rearwardly. A cylindrical sleeve 177 is pivotally held between the legs of the bracket 169 by a pin 179 that engages vertically aligned holes 181, only one of which is shown, in the legs of the bracket. A drawbar 183 is welded to the sleeve 177 and extends rearwardly therefrom. The rear end 185 of the drawbar 183 is bifurcated and receives a ground engaging stick 187 having a series of holes 189 through any of which may be inserted a pin 191 adapted to mate with a pair of aligned holes 193, only one of which is shown, in the bifurcated portion 185 of the drawbar 183. The stick 187 is normally held in an upright position by a pair of stops 195 and 197 fastened to the top and bottom, respectively, of the bifurcated end 185 in front and at rear of the stick 187. A pair of stops 199, only one of which is shown, is welded to the hinge sleeve 177 on opposite sides of the drawbar 183. The stops 199 extend forwardly and laterally and are arranged to contact the bight 171 of the bracket 169 upon a predetermined amount of lateral pivotal movement of the drag unit 165 toward either side of the tiller, thereby limiting the lateral swinging of the drag unit.

In operation, the engine 157 drives the rotor 153 in the direction of the arrow B (Fig. 9) causing the tiller to move forwardly over the ground to be tilled. The tiller is steered with the aid of the handle bars 163 by the operator who walks directly behind the tiller. In order to retard the forward movement of the tiller so that the rotor 153 will enter and break up the soil as it propels the tiller forward, the stick 187 is pressed into the earth by the operator pressing downwardly on the handle bars 163. The wheels 155 serve to limit the depth to which the rotor 153 enters the soil and also act as transporting wheels when the tiller is not in operation or when it is necessary to remove the rotor from the ground during operation to avoid an obstruction or the like. During periods when the wheels 155 are used as transporting wheels, the stick 187 is pivoted clockwise, as seen in Fig. 9, to remove it from contact with the ground. When it is desired to recommence the tilling operation, the stick is pivoted back to an upright position, as shown in Fig. 9, where the stops 195 and 197 will prevent the pivoting of the stick beyond an upright position. The pivotal connection 167 between the tiller frame 151 and the drag unit 165 makes the tiller very easy to steer and greatly increases its maneuverability, as compared with the previously known rigid frame tillers. In this connection, it should be noted that the closer the pivotal axis of the hinge 167 is to the axis of the rotor 153, the easier it will be to steer the tiller. Thus it is possible to quickly change the course of the tiller in order to cultivate close to plants and to steer around obstructions, and it is also possible to continuously operate the tiller with its drag unit 165 at a limited angle to the tiller frame 151 thereby making it easy to compensate for downhill side slippage of the tiller when it is being operated across a slope.

The modification disclosed in Fig. 10 is a rotary tiller similar to that of Fig. 9 and, consequently, a description of only the modified portion of the present tiller will suffice to give a complete understanding of its structure and operation. In the following description the parts of the modification of Fig. 10 which have analogous parts in the embodiment shown in Fig. 9 will be indicated by the same numeral as their aforementioned analogous parts but will be specially identified by the suffix letter *a*. In the modification shown in Fig. 10 the wheels 155a (Fig. 10) are attached to the drag unit 165a directly behind the hinge 167a and a single handle bar 201 is secured to the control unit 165a adjacent the point of attachment of the wheels 155a. This placement of the wheels 155a and the addition of the handle bar 201 on the drag unit 165a, further increase the ease of operation and maneuverability of the tiller in that they eliminate from the rotor unit the resistance to turning offered by the wheels 155a, and in that they increase the manueverability of the drag unit 165a by providing it with its own handle bar.

While we have described certain preferred embodiments of the present invention, it will be understood that various changes and modifications may be made in the details thereof without departing from the spirit and scope of the appended claims.

Having thus described the invention what we claim as new and desire to protect by Letters Patent is:

1. A soil tilling machine comprising a main frame, means connected to the main frame for moving it across the ground, an auxiliary frame connected to the main frame for lateral pivotal movement relative thereto, a ground engaging means carried by the auxiliary frame, and a turn limiting device for the auxiliary frame including a plate supported from one of the frames and having therein a stepped aperture including a plurality of sections of different widths and a lever movably supported by the other of said frames and extending through said aperture, said lever being selectively movable from one section of the aperture to another to vary the limits of lateral movement of the auxiliary frame with relation to the main frame.

2. A soil tilling machine comprising a frame, means connected to the frame for moving it across the ground, a ground engaging member connected to the frame for lateral pivotal movement relative thereto, and means for limiting the lateral pivotal movement of the ground engaging member including a plurality of pairs of abutment members rigid with said frame and spaced longitudinally from each other, the abutments of the several pairs being disposed symmetrically about and spaced differently from a longitudinal axis of the frame to define the lateral limits of a plurality of longitudinally spaced openings of different lateral extent, and a lever pivotally mounted on said ground engaging member for movement into position between the abutments of a selected pair of abutments to limit lateral pivotal movement of said ground engaging member.

3. A rotary soil tiller comprising a frame, means connected to the frame for moving it across the ground, a rotary ground tilling unit pivotally connected to the frame for lateral pivotal movement relative thereto, a rotatable power shaft carried by the frame, a shaft rotatably mounted on the rotary ground tilling unit, a universal joint connecting said shafts and having its center point in alignment with the axis of the pivotal connection between the rotary ground tilling unit and the frame, and a turn limiting device for said tilling unit including a plate having a stepped aperture therein supported by said frame, the sections of the aperture being symmetrical about a longitudinal axis of said frame and of progressively smaller lateral extent rearwardly of said frame, and a lever extending through said stepped aperture and pivotally supported from the tilling unit for movement longitudinally of the frame into a selected section of the stepped aperture to vary the limits of lateral pivotal movement of the tilling unit relative to the frame.

References Cited in the file of this patent

UNITED STATES PATENTS

| | | |
|---|---|---|
| 1,462,414 | Knowles et al. | July 17, 1923 |
| 2,159,448 | Olson | May 23, 1939 |
| 2,214,702 | Seaman | Sept. 10, 1940 |
| 2,632,518 | Pross | Mar. 24, 1953 |
| 2,634,666 | Merry | Apr. 14, 1953 |
| 2,697,973 | Silver et al. | Dec. 28, 1954 |

FOREIGN PATENTS

| | | |
|---|---|---|
| 524,138 | Germany | May 2, 1931 |
| 536,741 | Great Britain | May 21, 1941 |
| 679,663 | Great Britain | Sept. 24, 1952 |